(12) United States Patent
Buquet et al.

(10) Patent No.: US 6,368,387 B1
(45) Date of Patent: Apr. 9, 2002

(54) DEVICE AND PROCESS FOR RECOVERING POWDER AND INSTALLATION FOR SPRAYING COATING PRODUCT EQUIPPED WITH SUCH A DEVICE

(75) Inventors: Thierry Buquet, Allevard; Stéphane Bonal, Saint Martin le Vinoux; Michel Fossacera, Saint Martin d'Uriage; Daniel Belmain, Vaulnavey-le-Haut, all of (FR)

(73) Assignee: Sames Technologies, Meylan (FR)

( * ) Notice: Subject to any disclaimer, the term of this patent is extended or adjusted under 35 U.S.C. 154(b) by 0 days.

(21) Appl. No.: 09/604,668

(22) Filed: Jun. 27, 2000

(30) Foreign Application Priority Data

Jun. 28, 1999 (FR) .............................. 99 08432

(51) Int. Cl.⁷ .................... B01D 45/16; B01D 35/28
(52) U.S. Cl. .................. 95/271; 55/416; 55/459.1; 55/466; 55/DIG. 46; 118/326; 209/250; 454/53

(58) Field of Search ................. 55/459.1, 413, 55/416, 426, 466, 430, DIG. 46; 118/326, 603, 610; 454/53; 209/250; 95/268, 271

(56) References Cited

U.S. PATENT DOCUMENTS

| | | | | | |
|---|---|---|---|---|---|
| 3,801,869 | A | * | 4/1974 | Masuda | 454/53 |
| 4,249,655 | A | * | 2/1981 | Patureau et al. | 209/250 |
| 4,710,286 | A | * | 12/1987 | Mulder | 209/250 |
| 5,873,469 | A | * | 2/1999 | Stone | 209/250 |
| 6,251,296 | B1 | * | 6/2001 | Conrad et al. | 210/806 |

* cited by examiner

Primary Examiner—Robert A. Hopkins
(74) Attorney, Agent, or Firm—Browdy and Neimark, P.L.L.C.

(57) ABSTRACT

A device for recovering powder in an installation for spraying pulverulent coating product. The device includes: at least one cyclone for separating the powder recovered in the installation and its conveying air, and a sieve associated with the or each cyclone. The device further includes a perforated plate disposed on the path of the recovered powder, between the cyclone and the sieve.

12 Claims, 3 Drawing Sheets

DEVICE AND PROCESS FOR RECOVERING POWDER AND INSTALLATION FOR SPRAYING COATING PRODUCT EQUIPPED WITH SUCH A DEVICE

FIELD OF THE INVENTION

The present invention relates to a device and process for recovering powder and to an installation for spraying pulverulent coating product comprising such a device.

BACKGROUND OF THE INVENTION

In an installation for spraying coating product, it is known to recover the powder which has not been deposited on the objects to be coated and which mostly drops towards the booth floor. The recovered powder is directed towards a sieving device which allows evacuation of the possible piles of powder, waste and dirt mixed with the recovered powder. A suction sheath is generally provided in which a mixture is formed between conveying air and the recovered powder, this mixture being displaced up to a centrifugation cyclone in which the powder particles are separated from the conveying air before being directed towards a sieve from which the recovered powder is re-injected into a circuit feeding coating product to the sprays of the installation.

Now, the velocity of the air/powder mixture inside the separation cyclone may be very high, in particular in the lower part of the cyclone, i.e. in its zone of smallest radius. The powder therefore hits the mesh of the sieve at a high velocity and it tends to rub on this mesh before being stabilized, such friction provoking heating which may lead to a melting and even sometimes a total or partial polymerization of the powder on the upper face of the sieve, in particular on the outer zone thereof. For example, in the case of a disc-shaped sieve of radius R, it is not rare for the sieve to be clogged over an annular surface of radius included between R/2 and R. Such clogging of the sieve reduces its performances and necessitates regular maintenance, this increasing exploitation costs of such an installation accordingly.

It is a particular object of the present invention to overcome these drawbacks by proposing a powder recovery device which avoids both an undesirable heating of the powder particles when they come into contact with the sieve and consequently clogging of the sieve.

SUMMARY OF THE INVENTION

To that end, the invention relates to a device for recovering powder in an installation for spraying pulverulent coating product, this device comprising:
 at least one cyclone for separating the powder recovered in the installation and its conveying air, and
 a sieve associated with the or each cyclone, characterized in that it comprises a perforated plate disposed on the path of the recovered powder, between the cyclone and the sieve.

The perforated plate considerably reduces the tangential velocity of the air/powder mixture, with the result that the velocity of this mixture is low, and even virtually zero, when it comes into contact with the sieve. No noteworthy heating is created.

According to a first advantageous aspect of the invention, the plate is made of a material having a low coefficient of friction with the powder, in particular polyethylene or polytetrafluoroethylene. Thanks to this aspect of the invention, no heating is created either, when contact is made between the powder particles of the air/powder mixture and the perforated plate.

According to another advantageous aspect of the invention, the plate is made of an electrically conducting material, which allows the electrical charge possibly created by tribo-electric effect when the particles of powder rub on the plate, to run off.

The plate is advantageously disposed above the mesh of the sieve, parallel thereto, at a distance of between 0.5 and 30 cm.

According to variant embodiments of the invention, the plate may be provided to be perforated over substantially the whole of its surface or to be in the form of a disc and perforated solely over an outer annular part.

Whatever the embodiment considered, the diameter of the perforations of the plate is advantageously included between 2 and 20 mm.

The invention also relates to an installation for spraying pulverulent coating product, which comprises a powder recovery device as described hereinabove. Such an installation operates with a better yield insofar as it is unnecessary to provide periodic unclogging of the sieve that it comprises, while the quality of the recovered powder remains optimal.

Finally, the invention relates to a powder recovery process which may be carried out with the device as described hereinabove and in which:
 the powder recovered in a spray booth is conveyed towards a separation device,
 the powder is separated from its conveying air by using centrifugal forces and the recovered powder is sieved. This process further consists in considerably reducing the tangential velocity of the powder before it arrives in the sieving zone, by causing the air/powder mixture to pass through a perforated plate.

BRIEF DESCRIPTION OF THE DRAWINGS

The invention will be more readily understood on reading the following description of two embodiments of a device in accordance with its principle, given solely by way of example and with reference to the accompanying drawings, in which.

DESCRIPTION OF PREFERRED EMBODIMENTS

Figure 1:
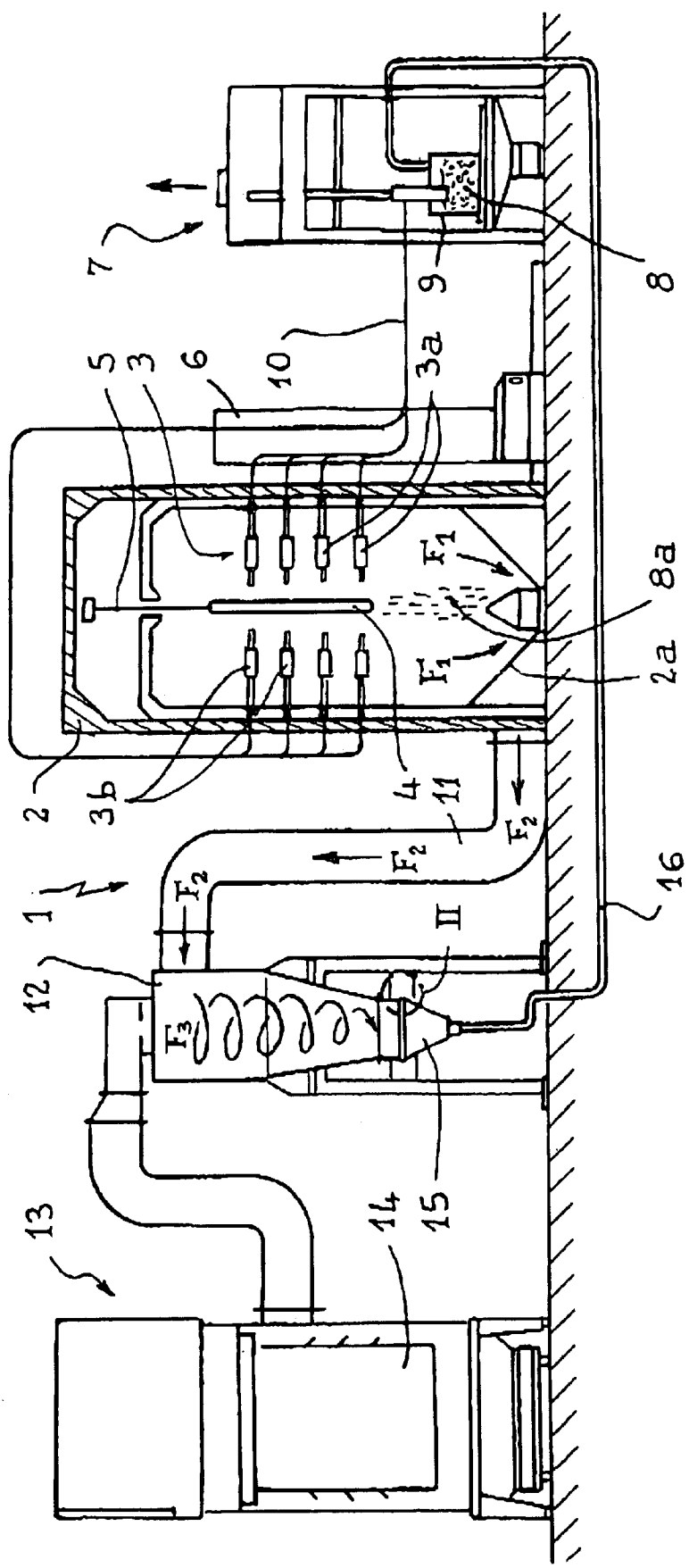
FIG. 1 schematically shows an installation for spraying pulverulent coating product according to the invention.

Referring now to the drawings, the installation 1 shown in FIG. 1 comprises a booth 2 in which a plurality of sprays 3 are disposed opposite objects 4 advancing on a conveyor 5. The sprays 3 are distributed in a first series of sprays 3a fixed inside the booth 2 and in a second series of sprays 3b supported by a reciprocator 6. A supply system 7 is provided to convey a pulverulent coating product 8, disposed in a container 9 such as a cardboard box, tip to the sprays 3 via a feed line 10. The sprays 3 may be of any known type, pneumatic or rotating, electrostatic or not, in particular tribo-electric or not.

Part 8a of the product 8 sprayed by the sprays 3 towards the objects 4 does not reach these objects and drops towards the bottom 2a of the booth 2, as represented by arrows $F_1$.

A suction flue 11 is connected to the bottom 2a of the booth 2 and causes the powder 8a recovered at said bottom 2a to move therefrom as represented by arrow $F_2$. The flue 11 opens out tangentially in the upper part of a cyclone 12, in which there is created a substantially helicoidal flow of the mixture of conveying air and recovered product 8a, this flow being represented by arrow $F_3$.

A suction unit 13 allows a fine filtration of the air issuing from the cyclone 12 thanks to one or more cartridge filters 14.

In the lower part of the cyclone 12 there is installed a sieve 15 intended to calibrate the recovered powder, the outlet of the sieve 15 being connected by a conduit 16 to the supply system 7 and more particularly to the internal volume of the container 9.

Figure 2:
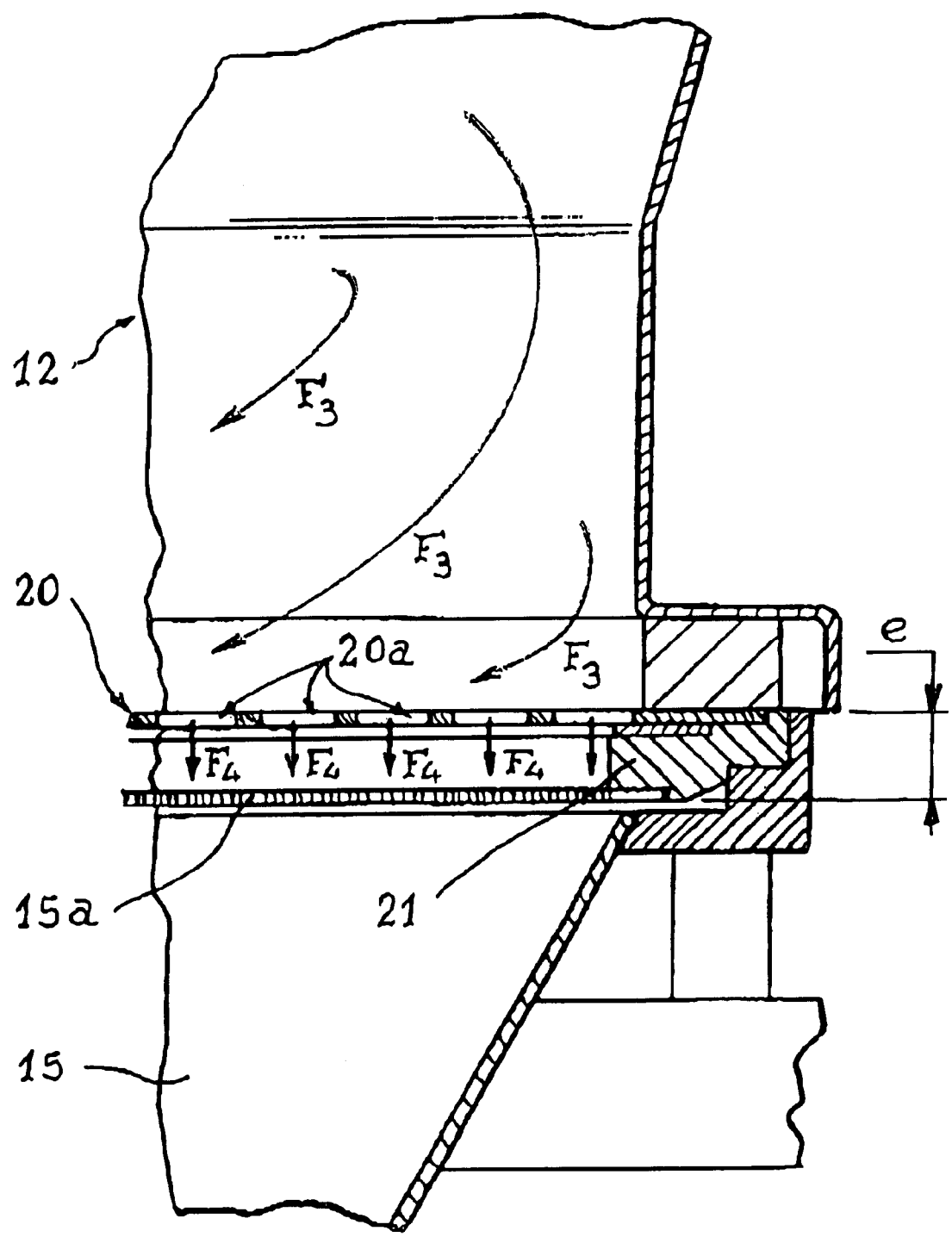
FIG. 2 is a view on a larger scale of detail II in FIG. 1.
Figure 3:
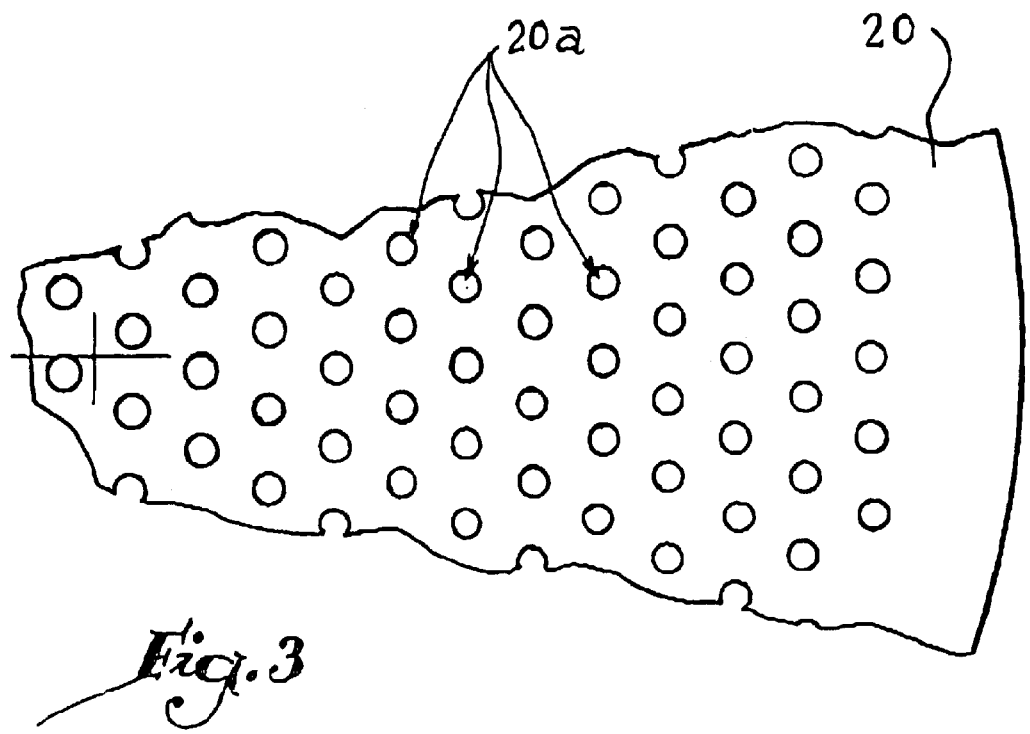
FIG. 3 is a plan view of a perforated plate used in the installation of FIGS. 1 and 2.

As is more particularly visible in FIGS. 2 and 3, a perforated circular plate 20 is disposed above the mesh 15a of the sieve 15 and parallel thereto. To that end, an annular distance piece, 21 is interposed between elements 15a and 20. This distance piece 21 also constitutes an O-ring ensuring that the cyclone operates correctly.

In this way, the air/powder mixture which is directed at a relatively high velocity towards the sieve 15, as represented by arrows $F_3$ in FIG. 2, strikes the plate 20, with the result that most of the kinetic energy of the powder particles is dissipated during the shock and the particles flow at low velocity, as represented by arrows $F_4$ in the direction of the sieve 15 on which they arrive without noteworthy heating. There is therefore no risk of the powder particles melting when they contact the sieve 15.

The orifices or perforations 20a are substantially circular and present a diameter of between 2 and 20 mm, i.e. largely greater than the maximum diameter of the particles of powders, which is of the order of 100 microns. In this way, there is no risk of the plate 20 being clogged by the accumulation of powder on its upper face.

The dimensions of the orifices 20a may be chosen so that their smallest dimension is at least twice the size of the mesh 15a.

In addition, the plate 20 is made of polyethylene which presents a low coefficient of friction with respect to the powder which is generally used for manufacturing pulverulent coating product. There is thus no risk of the edges of the orifices 20a overheating, which might lead to damaging the powder, in particular to at fusion thereof.

The plate 20 may be made of other suitable materials and, in particular, of polytetrafluoroethylene (PTFE) which also presents a low coefficient of friction with the powder.

The plate 20 is made of an electrically conducting material and earthed, which allows run-off of an electrical charge which may be created by tribo-electric effect during friction of the particles of powder against the plate 20, on its upper face or at the level of the edges of the orifices 20a.

The distance e between the plate 20 and the sieve 15 is of the order of some centimeters, for example between 0.5 and 30 cm, which allows the creation of a stabilized flow $F_4$ between the elements 20 and 15, without excessively increasing the total height of the powder recovery device.

The plate 20 is in the form of a disc, which is the most suitable for the conventional shape of the cyclone 12.

Figure 4:
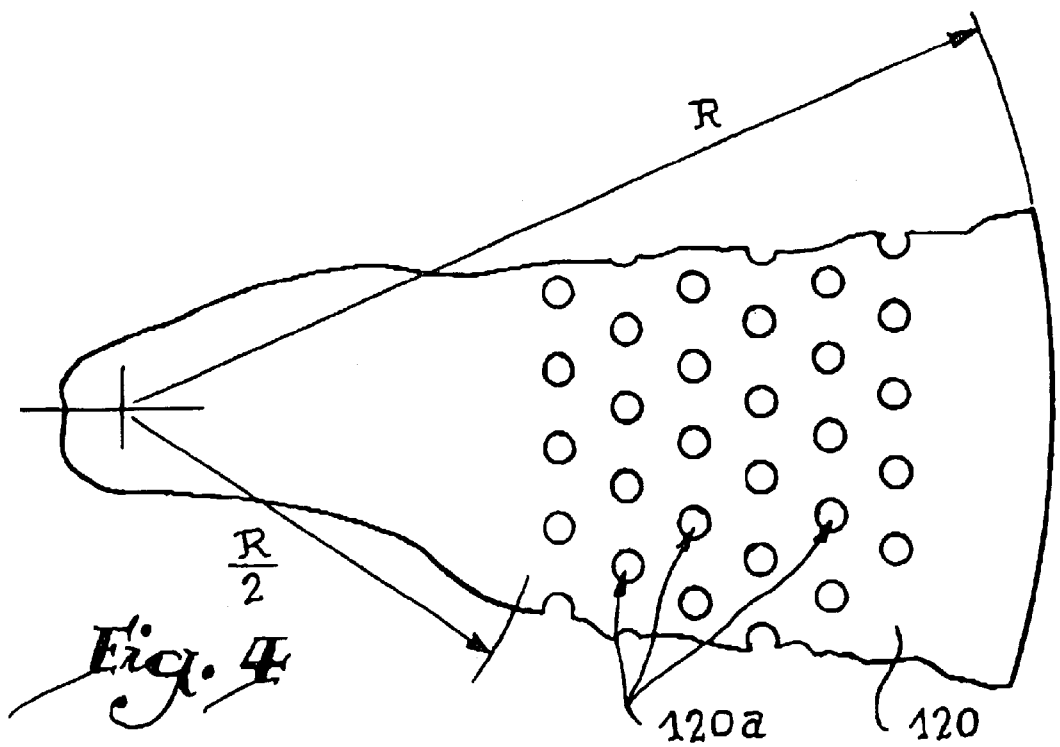
FIG. 4 is a view similar to FIG. 3 for a plate according to a second embodiment of the invention.

The plate 120 of the second embodiment shown in FIG. 4 is also disc-shaped and R denotes its radius. The plate 120 is provided with perforations 120a only in an outer annular zone included, for example, between circles of radius R/2 and R of the plate 120. In effect, most of the flow represented by arrow $F_3$ in FIG. 2 proves to occur near the lateral walls of the cyclone 12, with the result that it is unnecessary to provide perforations in the central part of the plate 120. This gives an increased rigidity to the plate 120 with respect to plate 20 and improves efficiency of the cyclone.

The invention has been shown with an installation comprising one separation cyclone. It is obviously applicable to an installation comprising a plurality of such cyclones, in which case a perforated plate is installed at the bottom of each cyclone, before the corresponding sieve.

Thanks to the invention, it is therefore possible to considerably reduce the tangential velocity of the powder, represented by arrow $F_3$ before it arrives in the sieving zone, i.e. on the sieve 15, which avoids clogging of this sieve and reduces the stoppages of the spray installation for the purpose of cleaning the sieve.

What is claimed is:

1. Device for recovering powder in an installation for spraying pulverulent coating product, said device comprising:

at least one cyclone for separating the powder recovered in the installation and its conveying air, and a sieve associated with the at least one cyclone, wherein the device further comprises a perforated plate disposed on the path of the recovered powder, between the at least one cyclone and the sieve.

2. The device of claim 1, wherein said plate is made of a material having a low coefficient of friction with the powder.

3. The device of claim 2, wherein said plate is made of polyethylene or polytetrafluoroethylene.

4. The device of claim 1, wherein said plate is made of an electrically conducting material.

5. The device of claim 1, wherein said sieve has a mesh and said plate is disposed above the mesh of said sieve, and parallel thereto, at a distance included between 0.5 and 30 cm.

6. The device of claim 1, wherein said plate is perforated over substantially the whole of its surface.

7. The device of claim 1, wherein said plate is in the form of a disc and is perforated solely over an outer annular part thereof.

8. The device of claim 1, wherein the diameter of the perforations of said plate is included between 2 and 20 mm.

9. The device of claim 1 wherein said perforated plate has perforations with a diameter large enough to pass all of the powder.

10. The device of claim 1 further comprising means including a conduit for conducting the powder recovered in the installation to the at least one cyclone.

11. Installation for spraying pulverulent coating product, comprising: a sprayer for spraying the pulverulent coating product onto an object to be coated; and a device for recovering coating product that has not been deposited on the object, said device comprising:

at least one cyclone for separating the powder recovered in the installation and its conveying air, a sieve associated with the at least one cyclone, and a perforated plate disposed on the path of the recovered powder, between the at least one cyclone and the sieve.

12. Process for recovering powder in a spray booth of an installation for spraying pulverulent coating product, in which:

the powder recovered in the spray booth is conveyed towards a centrifugal separation device, the powder is separated from its conveying air by using centrifugal forces in the centrifugal separation device, and the recovered powder is sieved in a sieving zone, wherein this process further comprises considerably reducing the tangential velocity of the powder before it arrives in the sieving zone, by causing the air/powder mixture to pass through a perforated plate.

* * * * *

UNITED STATES PATENT AND TRADEMARK OFFICE
CERTIFICATE OF CORRECTION

PATENT NO.     : 6,368,387 B1
DATED          : April 9, 2002
INVENTOR(S)    : Buquet et al.

It is certified that error appears in the above-identified patent and that said Letters Patent is hereby corrected as shown below:

<u>Title page,</u>
Item [75], delete "Fossacera" and insert therefore -- Fossaceca --.

Signed and Sealed this

Twenty-third Day of July, 2002

Attest:

Attesting Officer

JAMES E. ROGAN
*Director of the United States Patent and Trademark Office*